United States Patent [19]

Westbrook et al.

[11] Patent Number: 4,852,085
[45] Date of Patent: Jul. 25, 1989

[54] EXPANDABLE DIGITAL SWITCHING MATRIX WITH FAULT-TOLERANCE AND MINIMUM DELAY TIME

[75] Inventors: James E. Westbrook, Sylmar; Adolfo B. Suarez, Los Angeles, both of Calif.

[73] Assignee: Datos Corporation, Van Nuys, Calif.

[21] Appl. No.: 859,287

[22] Filed: May 2, 1986

[51] Int. Cl.[4] .................................... H04Q 11/04
[52] U.S. Cl. .................................................. 370/67
[58] Field of Search ............... 370/58, 63, 66, 67, 370/85

[56] References Cited

U.S. PATENT DOCUMENTS

| | | | |
|---|---|---|---|
| 3,311,706 | 3/1967 | Brightman et al. | 370/67 |
| 3,596,246 | 7/1971 | Nakagome et al. | 370/58 |
| 3,970,794 | 7/1976 | Neufang | 370/58 |
| 4,122,310 | 10/1978 | Rydén et al. | 370/58 |
| 4,287,590 | 9/1981 | Boute et al. | 370/67 |
| 4,377,859 | 3/1983 | Dunning et al. | 370/58 |
| 4,389,720 | 6/1983 | Baxter et al. | 370/67 |
| 4,616,360 | 10/1986 | Lewis | 370/67 |

Primary Examiner—Benedict V. Safourek
Assistant Examiner—Wellington Chin
Attorney, Agent, or Firm—Lyon & Lyon

[57] ABSTRACT

In a telecommunications switching system, the physical switching matrix is constructed in modular parts for easy expansion. A complete set of switching lines in one direction is cross-indexed with a partial set of switching lines in the other direction, and modular expansion is allowed by adding further partial sets of switching lines to further complete the matrix. Minimum bit delay is accomplished by routing all data bits through at most two data buffers on their transmission through the switch.

4 Claims, 1 Drawing Sheet

EXPANDABLE DIGITAL SWITCHING MATRIX WITH FAULT-TOLERANCE AND MINIMUM DELAY TIME

BACKGROUND OF THE INVENTION

Field of the Invention

The present invention relates to the field of data-over-voice (DOV) transmission of information in telephone switching systems. More specifically, it relates to the field of a physical switching matrix constructed in modular parts for easy expansion.

GENERAL BACKGROUND

Telecommunications switching systems and other data switching systems are constructed to carry data between pairs of stations in a large pool of stations. Message data is generated by one station (the "source") and forwarded to another station (the "destination") by means of the switching system. The switching system is responsible for buffering the data while it is in transit and for routing the data from source to destination.

Data is routed through a typical switching system by forwarding it to a central switch, which in turn forwards the data from one of several input ports to one of several output ports. A large central switch matrix is usually required to cross-index switching lines for one direction (input lines) with switching lines in the other direction (output lines). Buffer memory is also usually required to store the data while it is being routed by the switch.

While these prior art systems accomplish the objective of routing data from source station to destination station, they are subject to several drawbacks which are obviated by the present invention.

THE PRIOR ART

One major difficulty which present switching systems have is the large cost of the central switching matrix. Often this problem is coupled with the problem of expanding the system, either at a known time or in the envisioned future. Where only a few stations are connected, only a small switching matrix is required, but expansion to a larger system is very difficult and expensive. Where expansion to a larger system is envisioned, a large switching matrix is required, with concomitant waste of capability and cost. The present invention solves this problem by providing a distributed switching matrix which allows gradual growth of the system.

A second major difficulty which present switching systems have is the need for replacement of switching matrix elements when an error occurs. The ability to replace switching matrix elements (or alternatively, switching matrix access ports) without interrupting operation is called "hot carding". In present switching systems, the switching matrix is responsive to several of the access ports at once. When an access port is added or removed, data on that port's output lines is corrupted. The present invention provides a "hot card" capability by driving each output line by only one access port.

A third major difficulty which present switching systems have is the need for large amounts of memory to store incoming data which is being routed to a destination station. Storing incoming data in buffer memory and retrieving that data later are operations which take time and slow the operation of the switching system. The present invention obviates this problem by buffering at most two bits of the incoming data, thus improving the speed and reducing the complexity of the switching system.

OBJECTS OF THE INVENTION

Therefore, it is an object of the present invention to provide an improved expandable switching matrix.

It is a second object of the present invention to provide an improved method of data switching for an expandable switching matrix.

These and other objects of the present invention will become clear after an examination of the drawings, the description, and the claims herein.

SUMMARY OF THE INVENTION

In a telecommunications switching system, the physical switching matrix is constructed in modular parts for easy expansion. Modular expansion is allowed by adding further partial sets of switching lines ("port cards") to further complete the matrix. Each port card multiplexes data from up to eight input access ports onto a single time-division multiplexed "highway". Thirty-two of these highways are collected into a single data bus. The 256 input lines from the sixteen highways (delivering 256 input bits of data) are written into a 16-word RAM. Each output bit is then selected from the RAM and time-division multiplexed onto an output line for the output access port. Minimum bit delay is accomplished by routing all data bits through at most two data buffers on their transmission through the switch.

DETAILED DESCRIPTION

Figure 1:
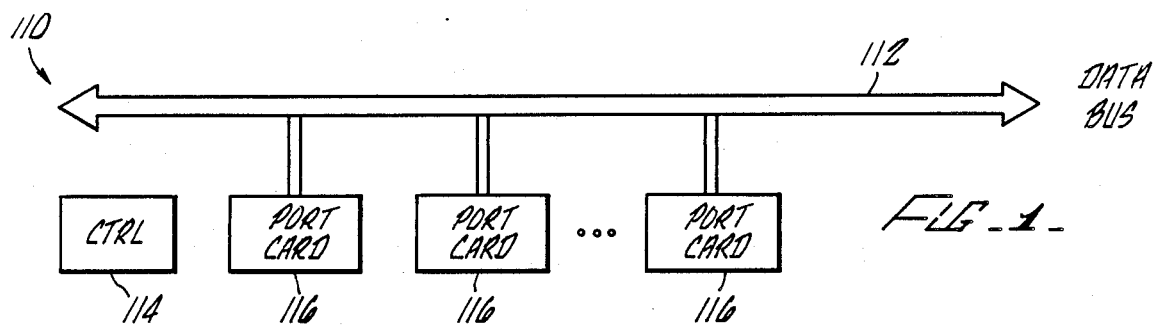
FIG. 1 is a block diagram of the switching system.

FIG. 1 is a block diagram of the switching system. A switching system 110 comprises a data-bus 112, a controller 114, and up to 32 port cards 116. The controller operates under the direction of software stored in local memory (not shown) ad may comprise any standard microprocessor of general-purpose design, e.g. the Intel 8031. The software performs the timing functions described below, as is well-known in the art, and construction of appropriate software is straight forward given the functions it is to perform. It controls the operation of the system via control lines (disclosed with reference to FIG. 3). Each port card switches data from eight input access ports (disclosed with reference to FIG. 2) onto the data-bus and from the data-bus to eight output access ports (disclosed with reference to FIG. 2). The number of port cards present may vary with the number of access ports which are needed.

Figure 2:
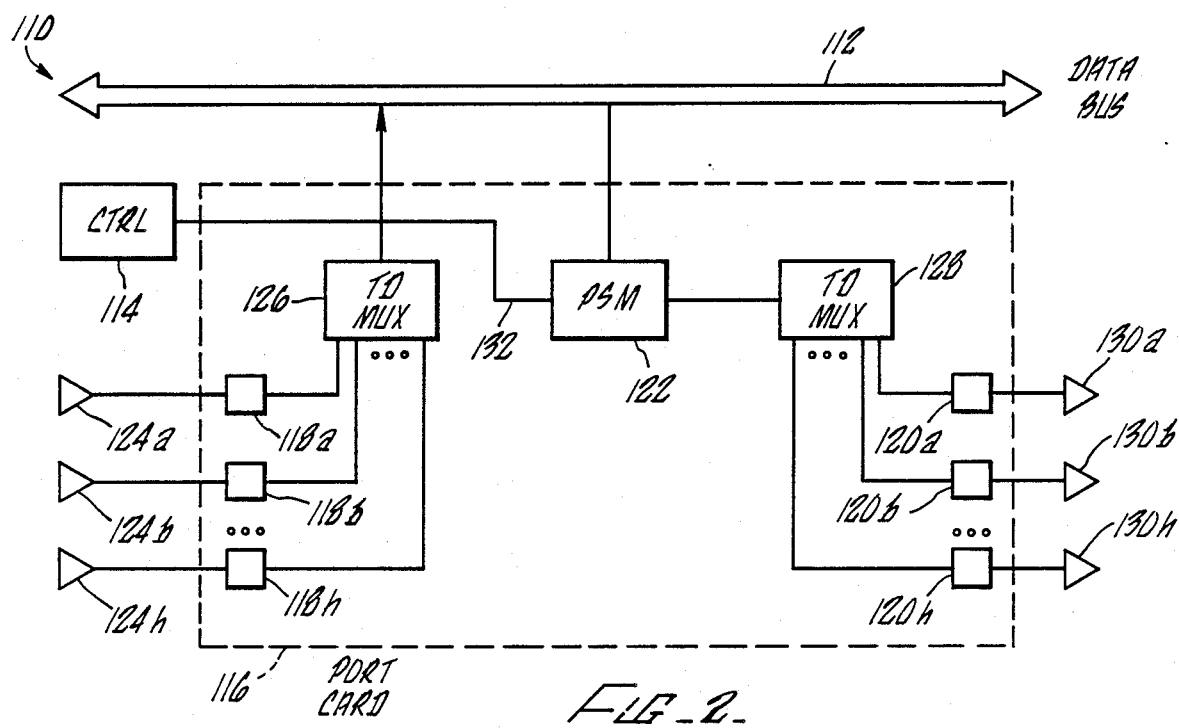
FIG. 2 is a block diagram of the port card.

FIG. 2 is a block diagram of the port card. Each port card 116 itself comprises eight input access ports 118a–h, eight output access ports 120a–h, and a partial switching matrix ("PSM") 122. The data bits from the input ports are multiplexed onto the data-bus 112, where they can be accessed by all port cards in the system. Each port card reads the data bits from the data-bus and forwards them to the appropriate output ports, thus performing its switching function with minimum time delay, as described below.

The system includes input line receivers 124*a–h*, each of which delivers line input signal to its respective input access port 118*a–h*, which samples the line input signal and latches a digital data bit. See our co-pending application, filed concurrently herewith, Ser. No. 859,786, titled "HIGH-SPEED DATA-OVER-VOICE FOR STANDARD LOCAL ENCODING AREA TELEPHONE LINKS," Ser. No. 859,286 filing date May 5, 1986, the disclosure of which is hereby incorporated by reference, for a detailed description of the line input signal. This data bit is forwarded to a time-division multiplexer 126, which inserts the bit into one of sixteen time slots and outputs the combined signal on a single wire of the data bus 112, called a "highway". A sequence of sixteen time slots fits exactly into one "line bit time," the amount of time a bit is present on an input access port. In a presently preferred embodiment of the invention, pairs of port cards are combined to fill up the sixteen time slots. In another possible embodiment, sixteen input and output ports are allotted per port card. Decreasing the number of line drivers per highway makes it easier to locate and fix system problems when one of the line drivers in the system fails.

The data-bus 112 comprises sixteen highways, each of which carries sixteen bits of data. Thus it carries 256 bits of data per line bit time. The PSM 122 reads these 256 input bits and generates an output signal of eight bits, one per output access port 120*a–h*. The controller 114 directs the operation of the PSM via control lines 132. The controller is made aware of the proper association of input ports with output ports by higher-level application programs. The controller makes a record of these connections in its control memory 140 (disclosed with reference to FIG. 3). The output signal is delivered to a time-division multiplexer 128, which separates out the data bits for each output access port 120*a–h*, each of which latches its data bit for delivery by its respective output line driver 130*a–h*.

Figure 3:
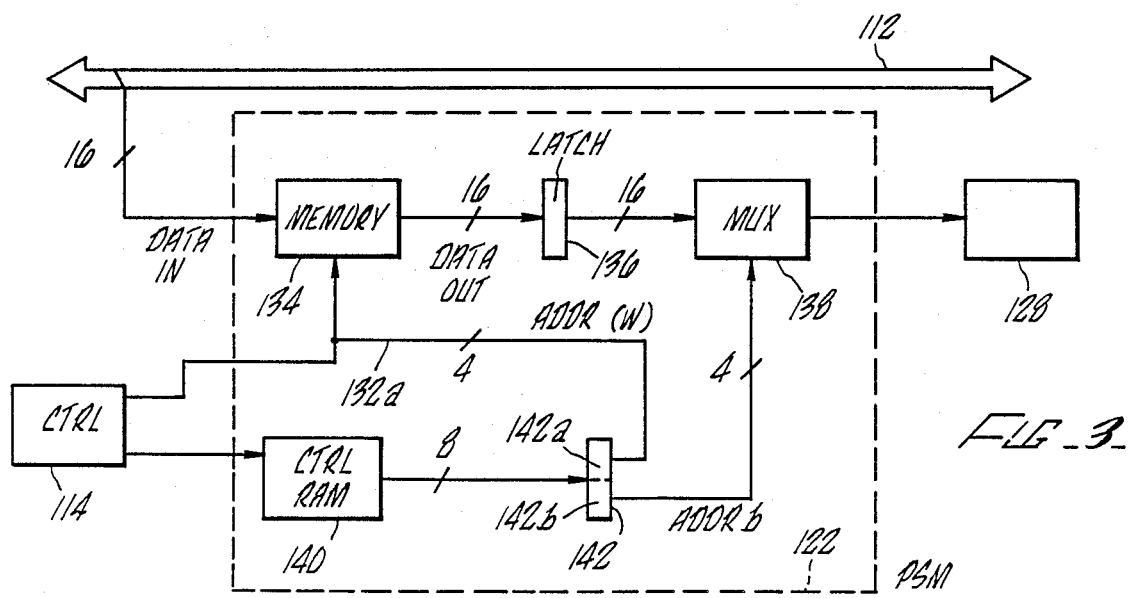
FIG. 3 is a block diagram of the partial switching matrix.

FIG. 3 is a block diagram of the partial switching matrix. As disclosed with reference to FIG. 2, 256 input bits of data are read from the data-bus 112 into the PSM 122. The data bits are read directly into a sixteen-word switching memory 134 under the direction of the controller 114. The controller places successive values 0 through 15 on the word-address line 132*a* and directs the memory to read sixteen bits per time slot from the data-bus. This fills the switching memory in one line bit time.

In a preferred embodiment of the invention, the switching memory is double-buffered to allow for reading the next set of data while the current set of data is being processed. Two physical banks of switching memory are used, one of which is filled with data, the other of which is accessed to process that data. The roles of these two banks of switching memory are exchanged once per line bit time. This process is not shown here because double-buffering of memory is well-known in the art.

The controller 114 next reads the bits out of its control memory 140 into a latch 142 to indicate which input ports are associated with which output ports. Each output port in the switching system 110 is assigned an eight-bit ledger entry in the control memory, indicating a bit address in the switching memory 134. Four bits of the ledger entry 142*a* identify the proper word within the switching memory; four bits of the ledger entry 142*b* identify the proper bit within that word.

The controller 114 then performs a "readout" operation—it reads output bits from the switching memory 134 in eight time slots, one for each output access port 120*a–h*. During each time slot, one word is read from the switching memory under control of the word-address line 132*a* and stored in a latch 136. One output bit is selected from the latched word by a multiplexer 138 under control of the bit-address line 132*b*. The bit selections from all eight time slots collectively form an eight-bit time-division multiplexed signal, which is forwarded to the time-division multiplexer 128 (disclosed with reference to FIG. 2).

It is seen that each port card 116 extracts data which has been routed from any of the maximum possible 256 input lines on the data-bus 112 to any of the eight output access ports 120*a–h* it is responsible for. Every connection through the switching system 110 is one directional, and every connection through the port card's partial switching matrix 122 is also one directional.

It is also seen that the switching system 110 is a time-space-time switch. Each port card 116 time-division multiplexes the input signals from its eight input access ports 118*a–h* onto the data bus 112. All of the maximum possible 256 input lines are collected as input to each partial switching matrix 122, and the output generated on each port card. Each port card time-division demultiplexes the output signals for its eight output access ports 120*a–h*.

It is further seen that switching is done on a bit-per-bit basis. Each bit to be routed is refreshed in the output of a latch with the information from the source, once per bit-time. Only two bits from the source of the connection are stored in the switch at any given time.

While a presently preferred embodiment has been disclosed, many variations are possible which remain within the scope of the present invention.

We claim:

1. A system for switching data from a plurality of input ports to a plurality of output ports, said system comprising a plurality of highway means for transmitting data and a plurality of port cards, each said port card having at least one output port associated therewith, and each said port card comprising
   (a) multiplexer means for multiplexing data from a plurality of said input ports onto one said highway means, wherein moving the port card does not affect said multiplexed data from any other port card; and
   (b) partial switching means for switching data from said plurality of highway means to a plurality of said output ports associated with said port card.

2. A system for switching data from a plurality of input ports to a plurality of output ports, said system comprising a plurality of highway means for transmitting data and a plurality of port cards, each said port card having at least one output port associated therewith, and each said port card comprising
   (a) multiplexer means for multiplexing data from a plurality of said input ports onto one said highway means, wherein moving the port card does not affect said multiplexed data from any other port card;
   (b) switching memory means, responsive to said plurality of highway means, for storing said multiplexed data as it is received from said highway means;
   (c) controller means for associating each said output port with one of said input ports; and (d) for each said output port associated with said port card, readout means, responsive to said switching memory means, for extracting said data recorded in said switching memory means from the respective input port associated with that respective output port.

3. A system for switching data from a plurality of input ports to a plurality of output ports, said system comprising a plurality of highway means for transmitting data and a plurality of port cards, each said port card having at least one output port associated therewith, and each said port card comprising (a) a time division multiplexer means for time-division multiplexing data from a plurality of said input ports onto one said highway means, wherein moving the port card does not affect said time division multiplexed data from any other port card;

(b) switching memory means, responsive to said plurality of highway means, for storing said time division multiplexed data as it is received from said highway means;

(c) controller means for associating each said output port with one of said input ports;

(d) readout means, responsive to said switching memory means, for extracting said data recorded in said switching memory means from the respective input ports associated with a plurality of said output ports associated with said port card, and for generating a time-division multiplexed signal indicative of said extracted data; and (e) time-division demultiplexer means for time-division demultiplexing said multiplexed signal.

4. The system of claim 1, wherein each said port card is connected to said plurality of highway means with a single line driver.

* * * * *